United States Patent [19]
Tandy

[11] 3,774,152
[45] Nov. 20, 1973

[54] SPEED CONTROLLED TAILLIGHT SYSTEM FOR A VEHICLE

[76] Inventor: Jack W. Tandy, McLeod Island S-S 61, Livingston, Mont. 59047

[22] Filed: Nov. 1, 1971

[21] Appl. No.: 194,264

[52] U.S. Cl.................. 340/62, 340/67, 340/76, 340/263
[51] Int. Cl............................ B60q 1/44, B60q 1/54
[58] Field of Search.................. 340/62, 66, 67, 71, 340/72, 263, 264

[56] References Cited
UNITED STATES PATENTS

| | | | |
|---|---|---|---|
| 1,573,638 | 2/1926 | Evelyn | 340/264 UX |
| 2,079,539 | 5/1937 | White et al. | 340/264 UX |
| 2,090,332 | 8/1937 | O'Neil | 340/62 UX |
| 2,632,152 | 3/1953 | Smith | 340/62 |
| 3,395,388 | 7/1968 | Hendrickson | 340/71 |
| 3,444,514 | 5/1969 | Yang | 340/66 |
| 3,535,680 | 10/1970 | Onksen et al. | 340/67 |
| 3,601,794 | 8/1971 | Blomenkamp et al. | 340/62 |

FOREIGN PATENTS OR APPLICATIONS

| | | | |
|---|---|---|---|
| 1,175,300 | 11/1958 | France | 340/263 |

OTHER PUBLICATIONS

German Printed Application 1,505,673, 2-1970, Barthel.

German Printed Application 1,915,277, 10-1970, Siensche.

Primary Examiner—Kenneth N. Leimer
Attorney—John D. Gould et al.

[57] ABSTRACT

A pair of groups of taillights for a vehicle for indicating to the driver of a following vehicle the condition of driving operation of the vehicle equipped with the groups of taillights. The lights of each group are of different colors and a switching arrangement, including speed responsive control switch means and brake operated switch means, are utilized to provide color combinations and color changes to indicate driving conditions of the vehicle, to the following driver.

3 Claims, 8 Drawing Figures

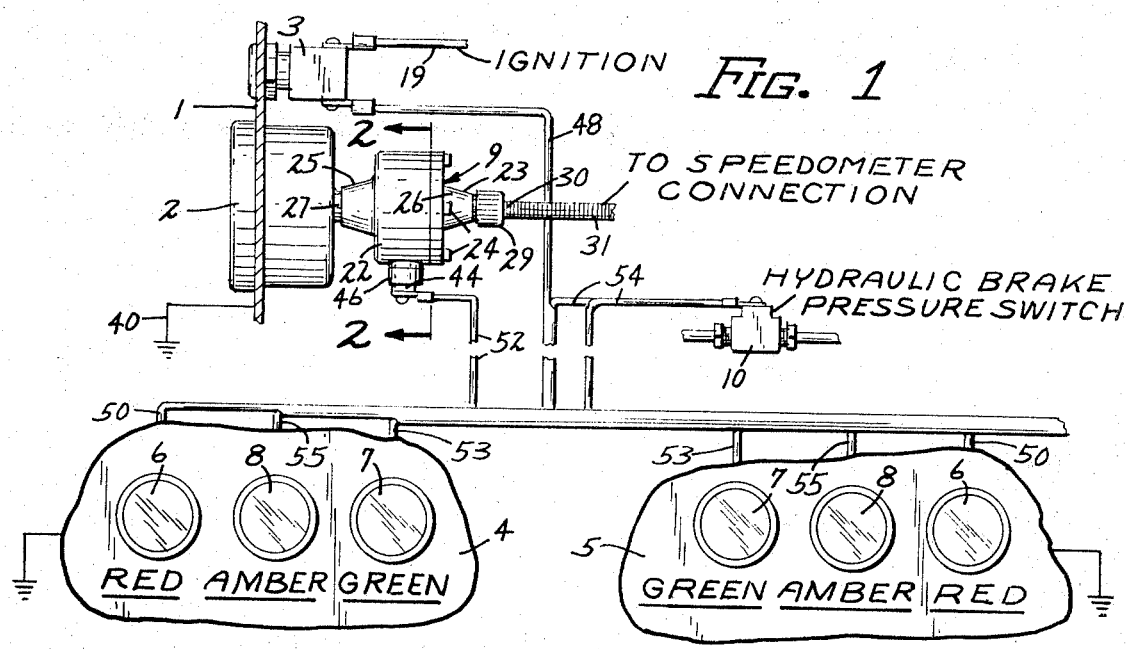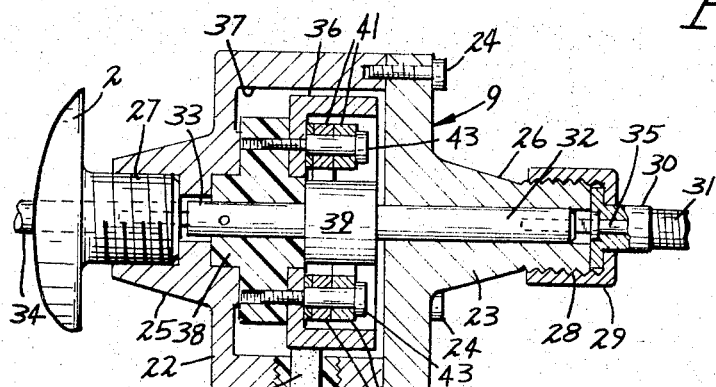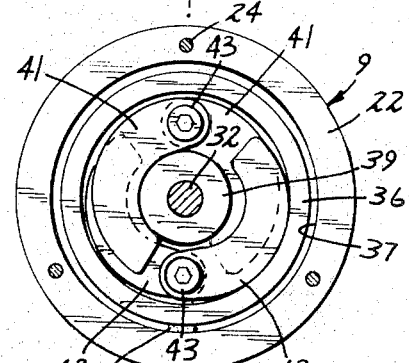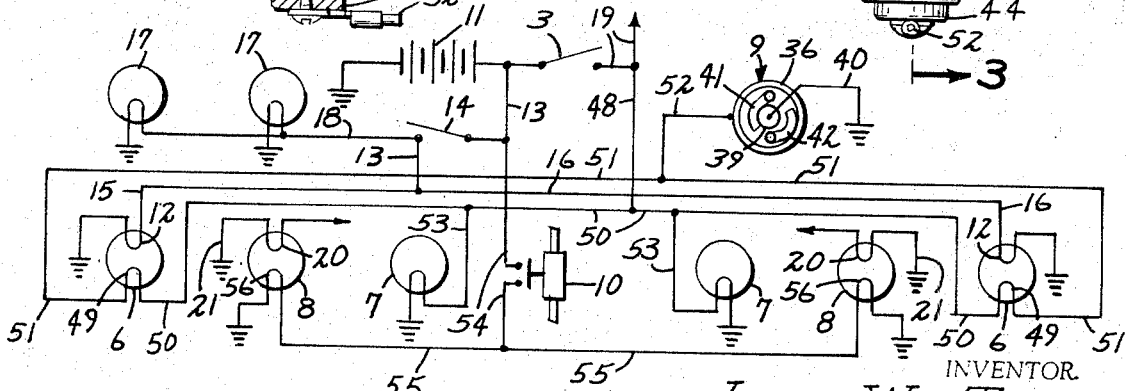

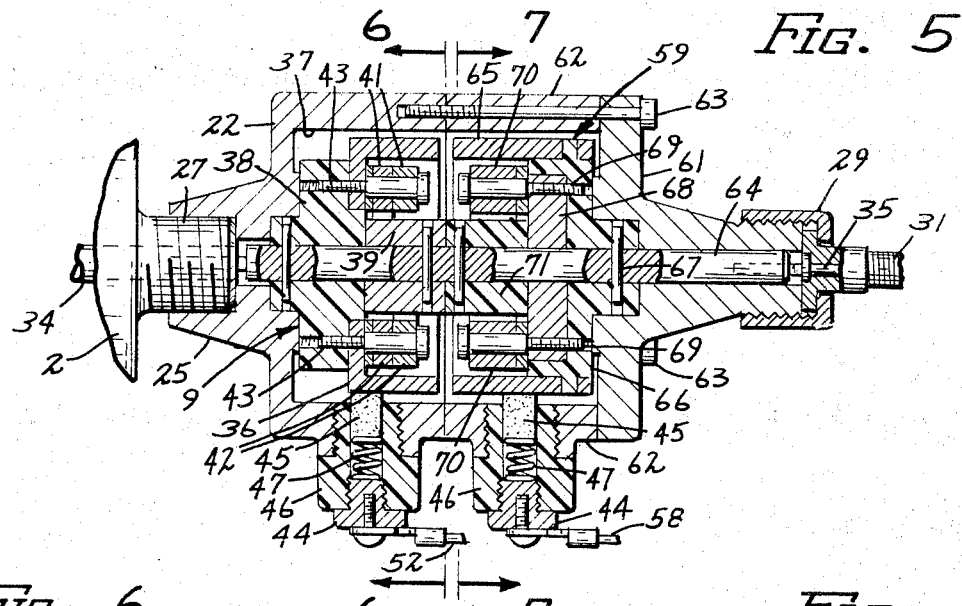
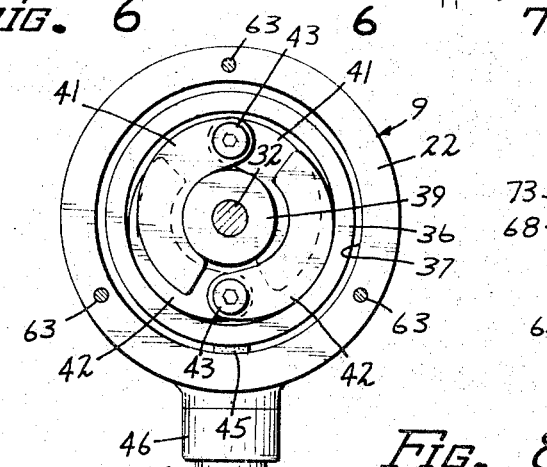
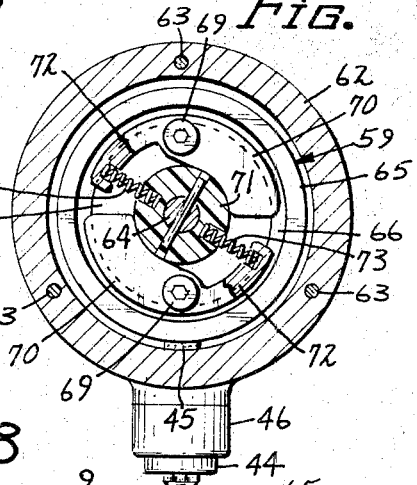
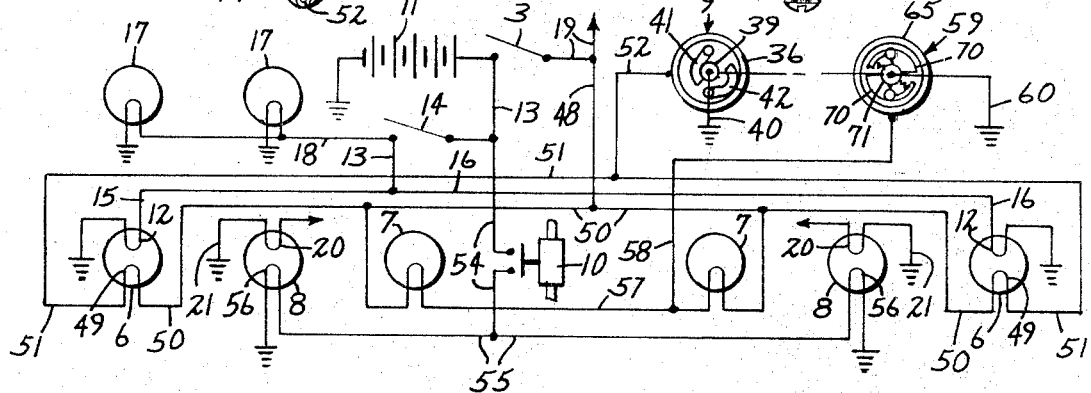

SPEED CONTROLLED TAILLIGHT SYSTEM FOR A VEHICLE

BACKGROUND OF THE INVENTION

Heretofore, vehicles have been provided with a plurality of taillights, these usually including stop lights and turn indicating signals, some using a multiplicity of lamps illuminated in succession to indicate an intentional vehicle turn. In most vehicles, provision is made to indicate by stop light to a following driver only that the brakes are being applied by the driver ahead. The stop light or lights are the same color as the usual taillights, the difference being only in intensity. Hence, with vehicles having normally bright taillights, it becomes rather difficult at times to distinguish between the normal taillights and stop lights.

SUMMARY OF THE INVENTION

An important object of this invention is the provision of a taillight system wherein the braking of a leading vehicle is readily and more clearly distinguished by a following vehicle driver than heretofore.

Another object of this invention is the provision of a taillight system that indicates more clearly to a following driver what are the driving conditions of the leading vehicle.

To the above ends, I provide a taillight system involving a widely separated pair of groups of taillights, each of the lights in each group having a different color than the other lights of the group. The system involves parallel circuitry including a main switch for energizing the system, a vehicle wheel speed responsive switch arrangement, and brake switch. The circuitry provides for different lamps or combinations of lamps to be illuminated under different conditions of vehicle operation. For example, when the vehicle is standing or is moving forwardly at speeds up to a given slow speed, a given lamp adjacent each side of the vehicle is illuminated. When the vehicle is being driven at speeds in excess of the given low speed, another lamp or a combination of lamps adjacent each side of the vehicle are illuminated. When the vehicle brakes are applied, still another lamp or combination of lamps adjacent each side of the vehicle are illuminated while the vehicle wheels are rotating at speeds above said predetermined speed, the color arrangement changing again when the vehicle wheel speed reaches and goes slower than said predetermined speed with the brakes still being applied. With these arrangements, a following driver can determine, to some extent at least, under what driving conditions the car ahead is operating. A definite change in lighting arrangement calls the attention of the following driver to the fact of changing conditions. Thus, the following driver is more readily prepared to take suitable action if such becomes necessary.

DESCRIPTION OF THE DRAWINGS

FIG. 1 is a fragmentary view, partly in elevation and partly diagrammatic, of a preferred embodiment of the taillight system of this invention;

FIG. 2 is an enlarged fragmentary section taken on the line 2—2 of FIG. 1;

FIG. 3 is a fragmentary section taken substantially on the line 3—3 of FIG. 2;

FIG. 4 is a wiring diagram of the system illustrated in FIGS. 1-3;

FIG. 5 is a view corresponding to FIG. 3 but showing a modified arrangement;

FIGS. 6 and 7 are transverse sections taken on the lines 6—6 and 7—7 respectively, of FIG. 5; and FIG. 8 is a wiring diagram of the system utilizing the switch mechanism illustrated in FIGS. 5-7.

DETAILED DESCRIPTION OF THE PREFERRED EMBODIMENT

In the preferred embodiment of the invention illustrated in FIGS. 1-4, an instrument panel of an automotive vehicle is shown fragmentarily and indicated at 1, the same having mounted thereon a conventional speedometer 2 and an ignition switch 3. Rear exterior wall portions of the vehicle are indicated at 4 and 5, these being left and right hand portions respectively of the rear wall of the vehicle. Mounted in the wall portions 4 and 5 are taillights arranged in pairs, one of the taillights of each pair being disposed at a different wall portion 4 and 5, the taillights being hereinafter designated as first, second and third lamps indicated at 6, 7 and 8 respectively. For the purpose of illustration, the first lamps 6 are shown in FIG. 1 as being red, and second lamps 7 being green, and the third lamps 8 as being amber.

The several lamps 6, 7 and 8 are arranged in circuitry involving the ignition switch 3, a speed responsive control switch indicated generally at 9, a conventional hydraulic brake pressure switch 10 and a conventional battery 11. With reference to FIG. 4, it will be seen that the lamps 6 and 8 are double filament lamps, one of the filaments in each of the lamps 6 indicated at 12, being interposed in parallel relationship in a circuit including a lead 13 extending from the battery 11, and in which is interposed a lighting switch 14, and branch leads 15 and 16 extending from the battery 11, and in which is interposed a lighting switch 14, and branch leads 15 and 16 extending from the lead 13 to respective ones of the filaments 12. The switch 14 is operative to illuminate a pair of conventional head lamps 17 interposed between ground and a lead 18 connected to the lead 13. The ignition switch 3 is interposed in a lead 19 that is connected to the lead 13 intermediate the battery 11 and light switch 14 and supplies current to the ignition system of the vehicle, not shown. The third lamp 8 like the lamps 6 are double filament lamps, having filaments 20 that are interposed in ground leads 21 which may be assumed to be portions of well-known turn signal circuits, not shown, of the vehicle.

The speed responsive control switch 9 comprises a pair of housing members 22 and 23 secured together by machine screws or the like 24 and having axially aligned hub portions 25 and 26 respectively. The hub portion 25 is internally threaded for screw threaded engagement with a bearing boss 27 on the vehicle speedometer 2, the hub portion 26 having an externally threaded end 28 for threaded engagement with a retainer cap 29 that anchors the adjacent end 30 of a conventional speedometer cable housing 31 to the housing member 23. A rotary shaft 32 extends axially of the housing members 22 and 23 and has an outer end 33 that is keyed or otherwise secured to the adjacent end of a speedometer shaft 34 that is journalled in the bearing boss 27 of the speedometer 2. The opposite or outer end of the shaft 32 is operatively coupled to a speedometer cable 35 to be rotated thereby. Although not shown, it will be appreciated that the speedometer cable 35 is operatively coupled to one of the wheels of the vehicles or to a portion of the running gear thereof to be driven thereby in the usual manner.

An annular metallic rotor 36 is mounted on the shaft 32 within a chamber 37 defined by the housing members 22 and 23, the rotor 36 being supported on the shaft 32 by a preferably non-metallic mounting collar or the like 38 pinned or otherwise mounted on the shaft 32 for common rotation therewith. The shaft 32 is formed to provide a diametrically enlarged cylindrical terminal portion 39 which makes electrical contact with the housing members 22 and 23 and speedometer 2 which is grounded through the instrument panel 1 and as indicated in FIG. 1 by ground lead or the like 40. Pairs of arcuate metallic connector members 41 and 42 are pivotally mounted within the annular rotor 36 on mounting screws or the like 43 that extend through diametrically opposed portions of the rotor 36 and are screw threaded into the mounting collar 38, the screws 43 being parallel to the axis of the shaft 32 and rotor 36. When the rotor 36 is stationary, one or more of the connector members 41 or 42 swings to rest against the terminal portion 39 of the shaft 32, grounding the rotor 36. During rotation of the shaft 32 at and above the predetermined relatively low vehicle speed, the arcuate connector members will be pivotally moved about the axes of their respective screws 43 outwardly out of contact with the terminal portion 39, or to a switch opened position. The rotor 36 is connected to a terminal 44 by means of a brush 45 slidably mounted in an insulator grommet or bushing 46 mounted in the housing member 22, see particularly FIG. 3. The terminal 44 is mounted in the bushing 46, and a coil compression spring 47 of electrical conducting material is interposed between the terminal 44 and the brush 45 to hole the brush 45 in sliding engagement with the outer peripheral surface of the rotor 36.

The circuitry of the taillight system includes the first lamps 6, the speed responsive control switch 9, battery 11 and ignition switch 3. A lead 48 is connected at one end to the lead 19 and to filaments 49 in the lamps 6 by means of branch leads 50. Other branch leads 51 extend from the filaments 49 and are connected to a single lead 52 that is connected to the terminal 44 of the speed responsive control switch 9. In FIG. 4, the terminal portion 39 is shown as being connected to the ground through the lead 40 extending directly thereto. A second circuit arrangement includes the battery 11 switch 3, lead 48, portions of leads 50, grounded branch leads 53 in which are interposed the filaments of the lamps 7.

A third circuit includes the battery 11, a portion of lead 13, a lead 54 in which is interposed the brake pressure switch 10, and a pair of grounded branch leads 55 connected to the lead 54 and in each of which is interposed the filament 56 of a different one of the lamps 8.

OPERATION OF SYSTEM OF FIGS. 1–4

As an example, the speed responsive control switch 9 is arranged so that the arcuate connector members 41 and 42 are moved out of engagement with the terminal portion 39, or to a switch opened position, when the vehicle speed reaches approximately 5 miles per hour. With the ignition switch closed and the vehicle at rest or moving forwardly up to the predetermined low speed of 5 miles per hour, the filament 49 of the lamps 6 are energized, so that the lamps 6 as well as the lamps 7 are illuminated. It will be noted that the lamps 7 are illuminated at all times during a switch closed condition of the ignition switch 3. As soon as the vehicle accelerates to speeds in excess of 5 miles per hour, the connector members 41 and 42 are moved by centrifugal action out of engagement with the terminal portion 39, thus opening the parallel circuits to the filaments 49 of the lamps 6, so that only the lamps 7 are illuminated. Then when the vehicle brakes are applied at any speed above the predetermined low speed the switch 10 is closed to complete parallel circuits through the filaments 56 of the lamp 8, so that the lamps 8, as well as the lamps 7, are illuminated. This indicates to an operator of a following vehicle that the brakes are being applied. As the vehicle decelerates to said predetermined low speed, with the brakes applied, one or more of the connector members 41 or 42 comes into contact with the terminal portion 39, closing the circuits through the filaments 49 of the lamps 6, so that all of the lamps are illuminated. It will be noted that, should sufficient pressure be applied to the vehicle brakes to cause the wheels to skid at a vehicle speed greater than the predetermined slow speed of 5 miles per hour, all of the taillights will be illuminated, indicating to the following vehicle operator that a panic stop is in progress and that the following vehicle operator should act accordingly. When the vehicle is stopped and brake pressure released, only the lamps 6 and 7 will be illuminated. As hereinbefore indicated, the filaments 20 of the lamp 8 are selectively energized through the customary turn signal apparatus of the vehicle and when the switch 14 is closed, the head lights as well as the filaments 12 of the taillight 6 are energized. It should be understood that, when the switch 14 is closed for driving in darkness, energization of the filaments 49 and 56 intensify the light eminating from their respective lamps 6 and 8, in the manner of present day stop lights.

MODIFIED SYSTEM OF FIGS. 5-8

For the most part, the circuitry illustrated in FIG. 8 is identical to that of FIG. 4. Hence, those portions of FIG. 8 that are identical to corresponding portions of FIG. 4 are identified by the same reference numerals. With reference to FIG. 8 it will be seen that the lamps 7 are not grounded, but that the filaments thereof are connected by branch leads 57 and a common lead 58 to a speed responsive control switch 59 grounded as indicated by a lead 60 in FIG. 8, and as hereinafter described.

As shown in FIGS. 5–7, the switch 59 is added to the switch 9, and involves a housing comprising end housing sections 22 and 61 and an intermediate housing section 62 all being secured together in axial alignment by screws 63, one of which is shown in FIG. 5. The housing section 22 is screw threadedly mounted on the bearing boss 27 of the speedometer 2 in the manner described above with respect to the form of the invention illustrated in FIG. 1–4. An axial shaft 64 is journalled in the housing sections 22 and 61, and is connected at its opposite ends to the speedometer shaft 34 and speedometer cable 35 in the same manner as the shaft 32.

The speed responsive control switch 59 comprises a generally cylindrical rotary conductor 65 that is carried by a mounting collar 66 pinned or otherwise rigidly secured to the shaft 64, as indicated at 67. An annular conductor member 68 is mounted on the shaft 64 immediately adjacent the mounting collar 66, and is secured to the mounting collar by means of a pair of diametrically opposed parallel shoulder screws 69 each of which pivotally mounts one of a pair of diametrically opposed connector members 70 that are moveable between operative switch closed positions in engagement with the inner surface of the cylindrical conductor member 65 and inoperative switch open positions against an insulating bushing 71 that is pinned or otherwise rigidly secured to the shaft 64. As shown in FIG. 7, the connector members 70 are provided with circumferentially extended portions 72 between which and the bushing 71 are interposed a pair of coil compression springs 73 that yieldingly urge the connector members 70 toward their inoperative switch open positions in engagement with the insulator bushing 71. The switch housing section 62, like the housing section 22, mounts an insulator grommet or bushing 46 slidably supporting a brush 45 that slidably engages the outer surface of the cylindrical conductor member 65, and which is yieldingly urged into engagement therewith by a coil compression spring 47 interposed between the brush 45 and a terminal 44 to which the lead 58 is connected.

OPERATION OF THE SYSTEM OF FIGS. 5–8

The speed responsive switch 59, unlike the switch 9, is arranged so that the connector members 70 move into switch closing engagement with their respective conductor member 65 when the vehicle speed reaches and increases beyond the predetermined low speed of 5 miles per hour or whatever speed is desired. During deceleration of the vehicle, the connector elements 70 move to their inoperative switch opened positions of FIG. 7 when the vehicle wheel speed decelerates beyond the predetermined slow speed. The system illustrated in FIGS. 5–8 operates in the same manner as that of FIGS. 1–4 except that the lamps 7 are illuminated only when the vehicle wheel speed exceeds the predetermined slow speed of approximately five miles per hour. Thus, when the vehicle is at rest without the brakes being applied, only the lamps 6 will be illuminated. When the vehicle moves forwardly beyond the predetermined slow speed, only the lamps 7 will be illuminated. When the brakes are applied at speeds in excess of the predetermined slow speed, lamps 7 and 8 are illuminated. When the brakes are applied to the extent that the wheel speed decelerates to and below the predetermined slow speed, and when the vehicle is stopped with the brakes applied, both lamps 6 and 8 are illuminated. Thus, the lamps 7 are illuminated only to notify a operator of a following vehicle ahead is making no move to stop quickly.

While I have shown and described a preferred embodiment of my speed controlled taillight system and a single modification thereof, it will be understood that the same is capable of further modification without the departure from the spirit and scope of the invention, as defined in the claims.

I claim:

1. A speed controlled taillight system for a vehicle, said system comprising; first, second and third lamp means each of a different color; said first lamp means including a lamp having a pair of filaments; vehicle wheel speed responsive control switch means; a brake operated switch; a manually operated ignition control switch; a source of electrical potential; and circuit means including:
   a. first circuitry comprising one of the filaments of said first lamp means, speed responsive control switch means, ignition control switch, and said source, for illuminating said first lamp means when the vehicle is at rest or the wheels thereof are rotating forwardly up to a predetermined low speed;
   b. second circuitry including said second lamp means, ignition switch, and said source, for illuminating said second lamp means;
   c. third circuitry including said third lamp means, brake operated switch and said source, for illuminating said third lamp means responsive to energization of the vehicle brake;
   d. said speed responsive control switch means being responsive to deceleration of the vehicle to said predetermined low speed to close the circuit through said first lamp means so that said first and third lamp means are illuminated during braking of the vehicle at and below said predetermined low speed;
   e. and fourth circuitry including said source, a manually operated lamp switch, and the other filament of said pair in said first lamp means, for illuminating said first lamp means independently of said others of the lamp means and independently of the others of said circuits.

2. The system defined in claim 1 in which said second circuitry comprises a circuit including said source, ignition switch, and second lamp means only, for illuminating said second lamp means independently of the others of said lamp means and independently of vehicle wheel speeds.

3. The system defined in claim 1 in which said second circuitry comprises a circuit including said source, ignition switch, second lamp means, and a second speed responsive control switch means, for illuminating said second lamp means responsive to increase of vehicle wheel speeds above said predetermined speed.

* * * * *